Feb. 3, 1925.
N. MILNER
STAKE RETAINER FOR VEHICLES
Filed Jan. 9, 1924
1,524,669
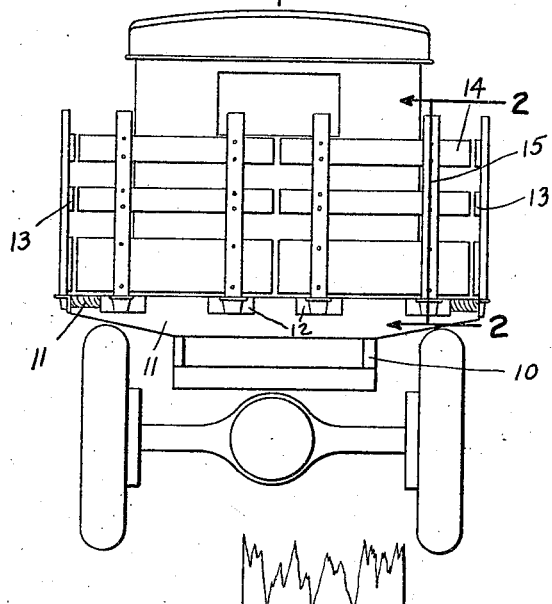
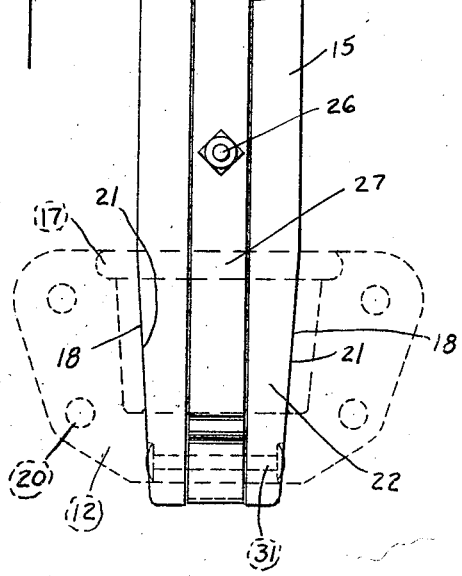
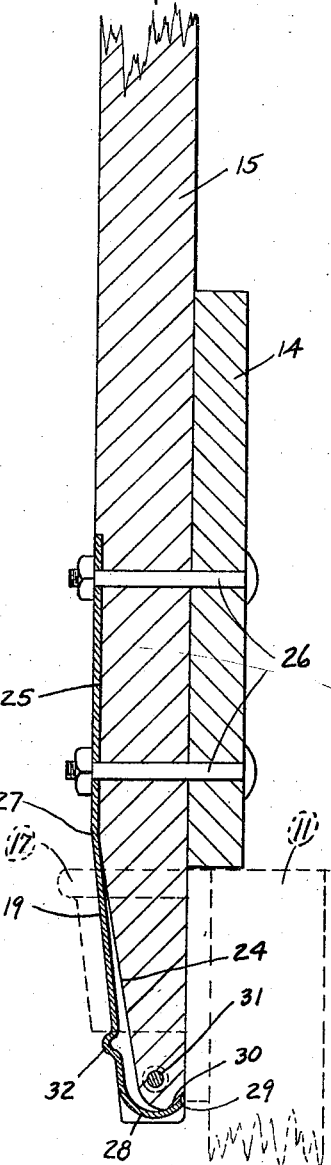
INVENTOR.
NUGENT MILNER.
BY
ATTORNEYS.

Patented Feb. 3, 1925.

1,524,669

UNITED STATES PATENT OFFICE.

NUGENT MILNER, OF EVANSVILLE, INDIANA, ASSIGNOR TO GRAHAM BROTHERS, OF EVANSVILLE, INDIANA, A CORPORATION.

STAKE RETAINER FOR VEHICLES.

Application filed January 9, 1924. Serial No. 685,282.

*To all whom it may concern:*

Be it known that I, NUGENT MILNER, a citizen of Canada, and a resident of Evansville, county of Vanderburg and State of Indiana, have invented a certain new and useful Stake Retainer for Vehicles; and I do hereby declare that the following is a full, clear, and exact description thereof, reference being had to the accompanying drawings, in which like numerals refer to like parts.

This invention relates to a stake retainer for vehicles.

The chief object of the invention is to provide a retaining connection between a stake and a vehicle body supporting the same, which connection is not only adapted to latch the stake to the body to prevent accidental removal therefrom, due to vehicle bouncing, but is also adapted to prevent excessive wear between the several parts and also to prevent rattling therebetween.

The chief feature of the invention consists in associating a yieldingly mounted latch with a stake and stake-receiving socket, whereby the foregoing object is accomplished.

Other features of the invention consist in the particular construction and arrangement of the several parts whereby the locking association is automatically disassociated upon intentional forcible action, and still other features of the invention will be pointed out more specifically hereinafter.

The full nature of the invention will be understood from the accompanying drawings and the following description and claims:

In the drawings, Fig. 1 is an elevational view of the rear of a truck type vehicle equipped with side frames including stakes. Fig. 2 is an enlarged sectional view taken on the line 2—2 of Fig. 1 and in the direction of the arrows. Fig. 3 is an elevational view of a single stake and socket therefor and illustrates in greater detail the same parts shown in Figs. 1 and 2.

In the drawings 10 indicates the frame of a vehicle herein shown of the truck type provided with a sill 11, and said sill 11 is provided with a plurality of socket forming brackets 12 at suitable intervals. Herein reference is had particularly to Fig. 1. The sides 13 are shown composed of an open framework including the planking 14 and the stake connecting portions 15. In Fig. 1 the truck is also shown provided with the end frames which herein are shown parted medianly of the truck. This particular arrangement is conventional, to permit the driver of the truck to have access to either half of the truck from the rear through either half of the tail framework. The sides may be similarly parted, and if desired as shown in Fig. 3, the framework may be omitted and single stakes may be substituted for said framework, i. e. when the nature of the load is such that stakes are more serviceable.

In the drawings particularly as shown in the several figures the socket forming bracket 12, as illustrated, includes a socket or pocket-forming portion 16 which is beaded as at 17, and said socket is herein shown provided with the oppositely inclined sides 18 and the inclined back 19. This forms a tapered socket with the sill face. Said bracket is suitably secured to the sill 11 by means of the wing or plate portions of said bracket and by suitable means associated with the openings 20 in said wing portions. Screws, bolts or rivets may be equally suitable for such permanent mounting.

The stake herein indicated by the numeral 15 is shown provided with an end having oppositely tapered sides 21 and a tapered connecting face 22. The tapering of the end of the stake substantially corresponds to the tapering of the socket, and thus a wedging action between the socket and stake is secured.

Normally it would be expected that such a tapering construction would permit of a wedging action between the stake and the socket, whereby the stake would be rather firmly secured in said socket. However, vehicles at the present time are self-propelled and travel at relatively high rates of speed. Uneven or rough pavements normally do not affect the removal of the stake from the socket when the vehicle is traveling at a moderate speed, such as comparable to a horse drawn vehicle. When, however, the vehicle travels at a higher rate of speed, the wedging action is insufficient to maintain the stake within the socket and an interlocking construction is necessary.

The interlocking construction herein disclosed is but one form of the generic type of the invention; and while shown associated with the tapered socket and the tapered stake end, the same is not necessarily restricted thereto, but is equally applicable in its broader scope to a full fashioned socket and a non-tapered stake.

Herein the stake 15 is shown provided with a longitudinally extending groove 23 near its lower end, and this groove gradually increases in depth, as at 24, as it approaches the end of the stake. Positioned within said groove 23 is a spring 25, herein shown secured in said groove and to the stake by the bolts 26 which are adapted, see Fig. 2, simultaneously to secure the planking 14 to said stake when the planking is utilized. The spring 25 is bent at 27 and normally projects outwardly from the remainder of the groove 24, see Fig. 2. The spring is herein shown extending to and beyond the end of the stake 15. Said extending end 28 is turned toward the end of the stake and is turned upwardly, as at 29, the groove 24 being extended rearwardly and upwardly, as at 30, to form a lock for the end of the spring. As shown clearly in Fig. 2, the spring end is prevented from springing outwardly from the stake end an excessive distance by this interlocking arrangement of the groove 30 and the end 29. To reenforce this portion of the stake, the rivet 31 is provided. The spring intermediate the end 28 and the bent portion 27 is provided with a curved ridge or corrugation 32 which forms a catch.

In operation, therefore, the stake 15 is inserted into the socket and as the same passes downwardly therethrough to be seated therein, the undercurved surface of catch 32 engages the inclined face 19 of said socket and is cammed inwardly so that it seats in the enlarged portion of the groove (24) and this is permitted by the free end of the spring 28 and 29 extending beyond said stake. Some of the extension may be taken up by decreasing the curvature by elongating end 28 if end 29 bears against the socket wall. When the catch portion 32 passes beneath the end of the open socket, it, by reason of the resiliency inherent in said spring strip, springs outwardly from the grooved portion 24 and seats beneath the lower edge of the socket. The upper curved surface of catch 32 insures locking of the stake. When in this position, the free end of the spring, as previously explained, engages the lower portion 30 of the stake. The intermediate portion which is seatable in the groove 24 while the stake is being inserted, thereupon engages the inclined side 19 of the socket and bears against the same substantially its entire length and forces the opposite face of the stake into engagement with the opposite face of the socket formed in the bracket 12. This construction prevents rattling of the stake in the socket, because it prevents movement therein; and since the amount of movement is reduced to a minimum, the wear between the several parts will be and is correspondingly reduced. Furthermore, bumping and bouncing of the vehicle body will not jostle the stake from the socket, since the catch 32 by engaging the under edge of the socket retains said stake therein.

To remove the stake from the socket, a pull upon the stake is sufficient to cause the under surface of socket 12 to engage the upper curved surface of catch 32, thereby depressing catch 32 and adjacent spring portions into the slot 23. Continued forcible pulling will cause withdrawal of the stake from the socket, the latch 32 yieldingly engaging the socket wall during this movement and the end of the spring functioning accordingly to permit such automatic action.

The invention claimed is:

1. A detachable connection for securing a stake to a vehicle body including a socket adapted to receive said stake and having a lower edge beyond which the stake projects, and a spring clip secured to the stake adjacent the socket-engageable portion and including an outwardly extending and substantially semi-circularly curved catch portion for engaging the lower edge of the socket for nesting the stake therein and preventing accidental removal of the stake from the socket and automatically permitting removal of the catch upon forcible removal movement of the stake.

2. A detachable connection for securing a stake to a vehicle body including a socket adapted to receive said stake and having a lower edge beyond which the stake projects, a spring clip secured to the stake above the socket-engageable portion and including a catch portion for engaging the lower edge of the socket for preventing accidental removal of the stake from the socket but permitting forcible removal thereof, said clip having its other end turned rearwardly and upwardly for movably anchoring the clip to the stake, and a groove in said stake adjacent the socket receivable portion adapted to receive said spring clip when said spring clip is inserted in the socket, said groove extending rearwardly and upwardly to receive the rearward and upward extension of said spring clip.

In witness whereof, I have hereunto affixed my signature.

NUGENT MILNER.